United States Patent
Carpenter et al.

(10) Patent No.: US 7,236,858 B2
(45) Date of Patent: Jun. 26, 2007

(54) FLIGHT MODE SYSTEM FOR PERSONAL ELECTRONIC DEVICE

(75) Inventors: Paul Carpenter, Twickenham (GB); Andrew Allen, Mundelein, IL (US)

(73) Assignee: Research in Motion Limited, Waterloo (CA)

( * ) Notice: Subject to any disclaimer, the term of this patent is extended or adjusted under 35 U.S.C. 154(b) by 256 days.

(21) Appl. No.: 11/010,945

(22) Filed: Dec. 13, 2004

(65) Prior Publication Data

US 2005/0267650 A1    Dec. 1, 2005

Related U.S. Application Data

(60) Provisional application No. 60/569,811, filed on May 11, 2004.

(51) Int. Cl.
  *G05D 1/00* (2006.01)
  *G01C 23/00* (2006.01)

(52) U.S. Cl. .............................. 701/3; 701/15; 701/200

(58) Field of Classification Search .................... 701/3, 701/2, 120, 15, 200; 340/901, 945, 963, 340/971, 425.5
See application file for complete search history.

(56) References Cited

U.S. PATENT DOCUMENTS

| | | | | |
|---|---|---|---|---|
| 5,438,610 A | * | 8/1995 | Bhagat et al. | 455/431 |
| 5,519,761 A | * | 5/1996 | Gilhousen | 455/431 |
| 5,659,475 A | * | 8/1997 | Brown | 701/120 |
| 5,995,833 A | * | 11/1999 | Zicker | 455/430 |
| 6,542,170 B1 | | 4/2003 | Williams et al. | |
| 6,577,419 B1 | * | 6/2003 | Hall et al. | 398/115 |
| 6,889,042 B2 | * | 5/2005 | Rousseau et al. | 455/431 |
| 2003/0130771 A1 | | 7/2003 | Crank | |

FOREIGN PATENT DOCUMENTS

| | | |
|---|---|---|
| EP | 0 891 110 | 1/1999 |
| EP | 0891110 | 1/1999 |
| EP | 1 035 746 | 9/2000 |
| EP | 1035746 | 9/2000 |
| EP | 1 041 849 | 10/2000 |
| EP | 1041849 | 10/2000 |
| EP | 1 052 864 | 11/2000 |
| EP | 1 054 570 | 11/2000 |
| EP | 1052864 | 11/2000 |
| EP | 1054570 | 11/2000 |
| EP | 0 976 272 | 5/2003 |
| EP | 0976272 | 5/2003 |
| EP | 1 242 986 | 3/2004 |
| EP | 1242986 | 3/2004 |

OTHER PUBLICATIONS

Installation and Getting Started Guide—BlackBerry Handheld, pp. 29, 31, 32, and 65, Research In Motion Corporation, Jul. 2001.

* cited by examiner

*Primary Examiner*—Y. Beaulieu

(57) ABSTRACT

A personal communications device includes a processor, a plurality of subsystems connected to the processor for exchanging signals therewith, at least one of the subsystems being configurable between a flight mode and a non-flight mode, an input device connected to the processor for inputting a flight mode selection thereto, and a flight mode module operable on the processor for causing the processor to monitor for input of a predetermined flight mode selection through the input device and configure the at least one subsystem into flight mode upon the input of the flight mode selection.

9 Claims, 6 Drawing Sheets

FLIGHT MODE SYSTEM FOR PERSONAL ELECTRONIC DEVICE

RELATED APPLICATIONS

This application claims priority to U.S. Provisional Patent Application No. 60/569,811 filed May 11, 2004, which is incorporated by reference.

BACKGROUND OF THE INVENTION

The present invention relates to systems for personal electronic devices that are used onboard aircraft during flight.

Under current safety regulations it is not permissible to have a mobile phone turned on during an aircraft flight. Other devices such as laptop computers are permitted to be used only at certain times during the flight.

Devices such as wireless enabled PDAs (Personal Digital Assistants) blur the distinction between mobile phone and computer as in addition to the wireless phone capability they contain computer-related functionality that is useful to a user even when the wireless part of the device must not be used. For this reason some wirless enabled PDA's, and other similar devices, can be switched into a "radio-off mode" which disables the radio functions of the device so it can otherwise be used during a flight. For example, one type of wirless-enabled PDA includes a menu icon that can be used to disable the radio. On such PDA, once the radio is displayed, the word "OFF" is shown next to a signal strength indicator on the display screen.

Many larger computing devices such as laptop computers are now also incorporating radio transmitting devices such as Wireless LANs and other peripherals, based on for example IEEE 802.11 and Bluetooth™.

It is currently necessary for the user of a wireless capable electronic device to be able to configure the wireless capable device for safe operation onboard an aircraft. However laptop computers in particular can be highly complex devices where the level of expertise necessary to safely reconfgure all the peripherals is such that this is beyond the capability of the average user and a major chore even for the expert user. In addition the wireless aspects of the devices and other peripherals may not be the only sources of interference with aircraft systems. The high frequencies of current microprocessor clock speeds are themselves in the radio frequency spectrum and it may be necessary to reduce the clock speeds of some devices to avoid the possibility of interference.

Thus, there is a need for simple and convenient mechanisms for configuring a personal electronic device for use onboard an aircraft and a need for an indicator that can be used by a variety of devices to indicate to users and/or flight crew that the devices are safe to use mid-flight.

SUMMARY

According to example embodiments, systems and methods are provided for allowing personal electronic devices to be placed in a flight mode so that the device can be used during normal flight of an aircraft.

According to one example embodiment, a personal communications device includes a processor, a plurality of subsystems connected to the processor for exchanging signals therewith, at least one of the subsystems being configurable between a flight mode and a non-flight mode, an input device connected to the processor for inputting a flight mode selection thereto, and a flight mode module operable on the processor for causing the processor to monitor for input of a predetermined flight mode selection through the input device and configure the at least one subsystem into flight mode upon the input of the flight mode selection.

According to another example is a method of placing personal electronic devices within an aircraft into a flight safe mode in which the electronic devices are configured for flight aboard the aircraft, including transmitting a flight mode signal to the personal electronic devices located within the aircraft thereby signalling the personal electronic devices to enter a flight safe mode.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Like reference numerals are used throughout the Figures to denote similar elements and features.

DETAILED DESCRIPTION

Figure 1:
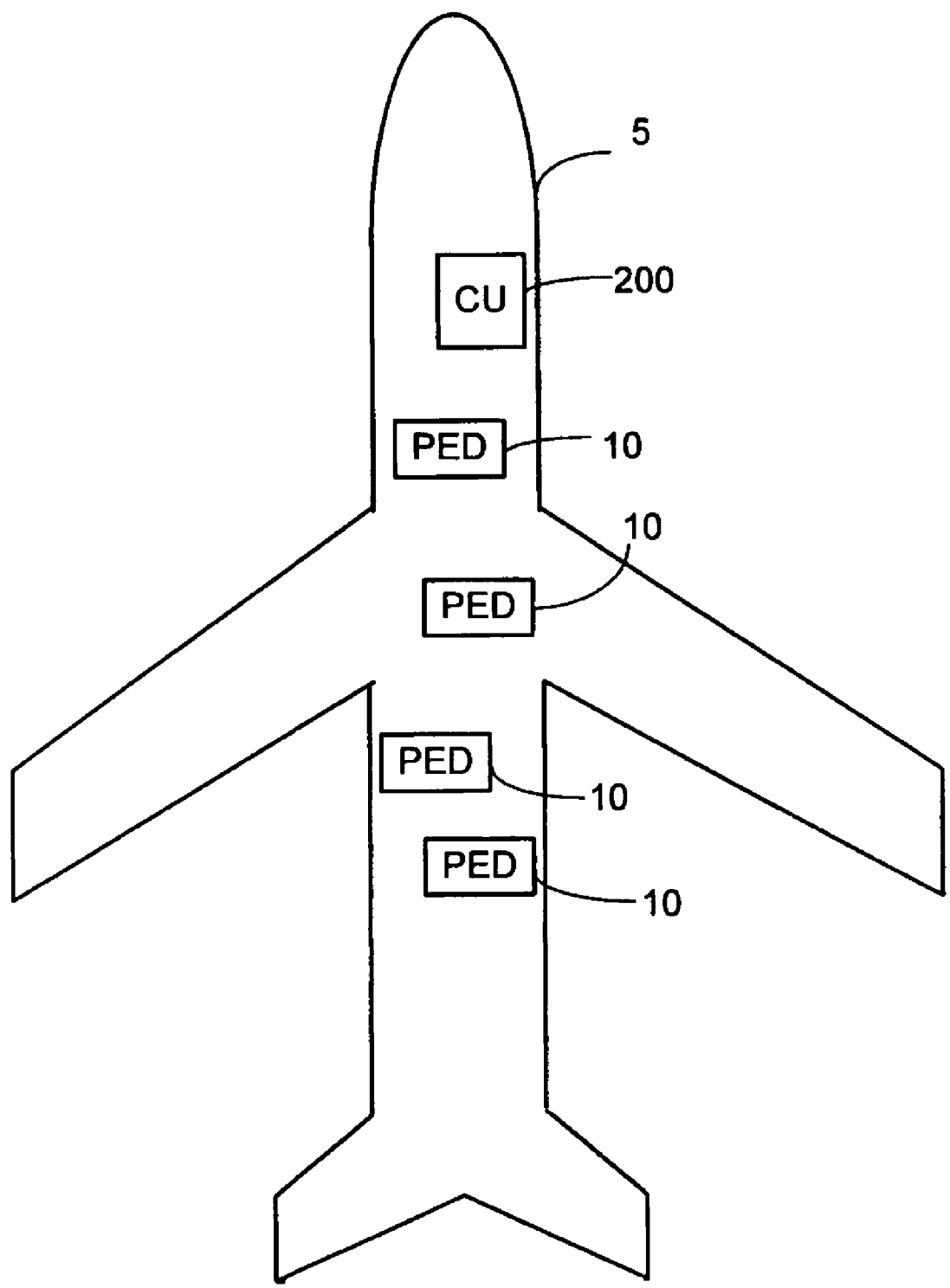
FIG. 1 is a schematic diagram showing an aircraft having a plurality of personal electronic devices aboard, to which example embodiments of the present invention may be applied.
Figure 2:
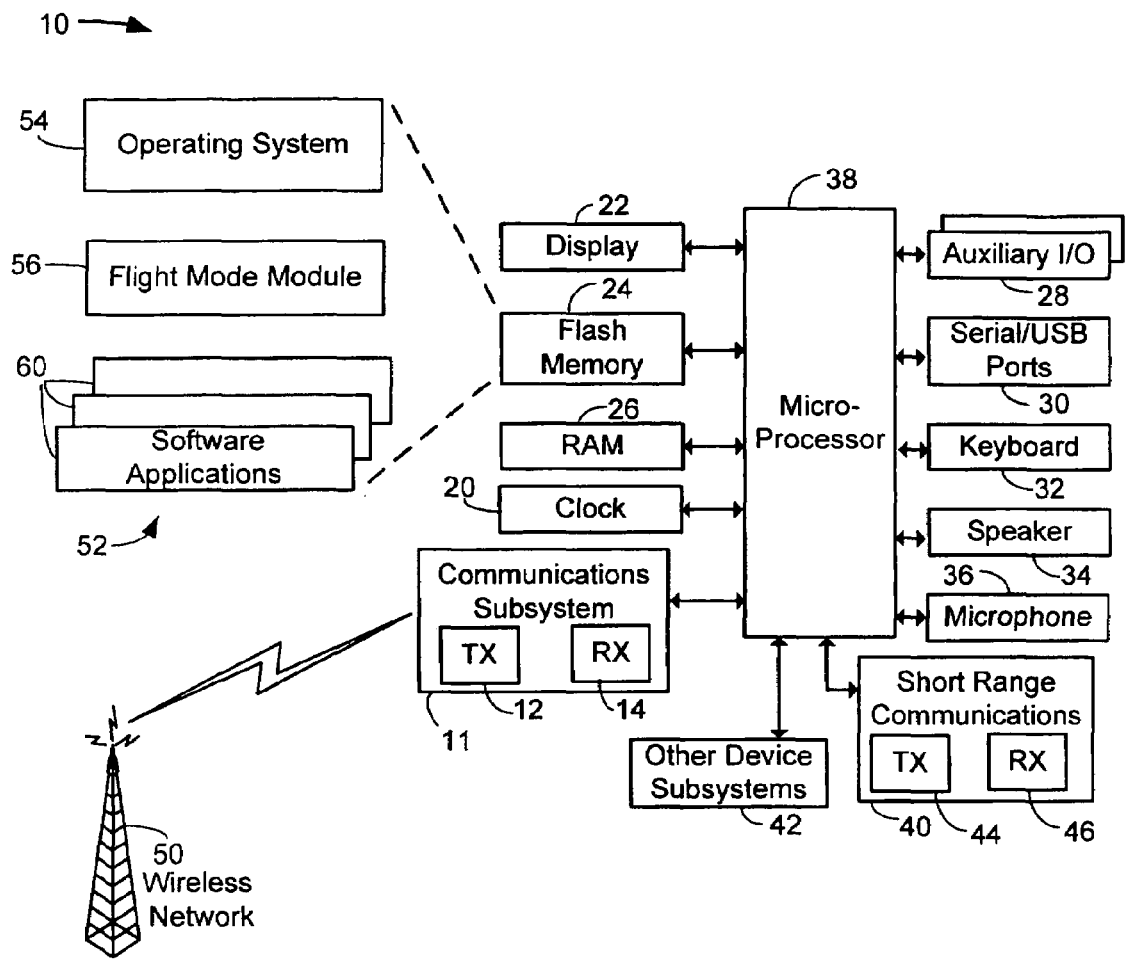
FIG. 2 is a block diagram showing a personal electronic device to which example embodiments of the invention may be applied.

Referring now to the drawings, FIG. 1 shows, for explanatory purposes, a representation of an aircraft 5 containing a number of passengers, at least some of whom have brought aboard personal electronics devices (PEDs) 10. Personal electronics devices 10 may include a range of different types of devices. By way of example, FIG. 2 shows a personal electronics device 10 according to example embodiments of the invention. The device 10 of FIG. 2 is a two-way communication device having at least data and, in some embodiments, also voice communication capabilities and/or the capability to communicate with other computer systems on the Internet. Depending on the functionality provided thereby, in various example embodiments the devices 10 may include, among other things, hand-held data communication devices, multiple-mode communication devices configured for both data and voice communication, mobile telephones, and/or PDAs (personal digital assistants), laptop computers, tablet computers or other portable processor based systems that are enabled for wireless communication. In some example embodiments, at least some of the systems and methods described herein could be applied to electronics devices that are not enabled for wireless communications, such as non-wireless network enabled PDAs or laptop computers for example.

The device 10 shown in FIG. 2 includes a communication subsystem 11 for exchanging wireless communications radio frequency signals with a wireless network 50. As will be apparent to those skilled in the field of communications, the particular design of the communication subsystem 11 will be dependent upon the communication network in which the device is intended to operate, but will generally include an RF (radio frequency) transmitter 12 and an RF receiver 14 for exchanging signals with wireless network 50. In devices that are not enabled for wireless communication, communications subsystem 11 may be omitted or inactive.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28, serial and/or USB port(s) 30, keyboard or keypad 32, speaker 34, microphone 36, a short-range communications subsystem 40, and any other device subsystems generally designated as 42. The device 10 includes at least one oscillator based clock circuit 20 which provides clock signals to microprocessor 38 and/or at least some of the device subsystems.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Resident on device 10 are various software modules 52, including for example operating system software 54, a flight mode module 56 and various software applications 60. In an example embodiment, software modules 52 are stored in a persistent store such as flash memory 24 or a hard drive or a similar storage element. The software modules 52 or parts thereof may be temporarily loaded into a volatile store such as RAM 26. Received communication signals may also be stored to RAM 26.

The microprocessor 38 enables execution of software modules 52 on the device. A predetermined set of applications which control basic device operations, including at least data and voice communication applications for example, will normally be installed on the device 10 during manufacture. Further applications 60, may also be loaded onto the device 10 through the network 50, an auxiliary I/O subsystem 28, serial and/or USB port(s) 30, short-range communications subsystem 40 or any other suitable subsystem 42, and installed by a user in the RAM 26 or a non-volatile store for execution by the microprocessor 38.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

Serial and/or USB port(s) 30 in FIG. 1 would normally be implemented in a personal digital assistant (PDA)-type communication device for which synchronization with a user's desktop computer (not shown) is desirable. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components and/or a wireless LAN ("Local Area Network") RF communications module based on, for example, Bluetooth™ or IEEE802.11 to provide for communication with similarly enabled systems and devices. The exact configuration of short range communications system 40 would depend on the specific short range network that it operated in, but if enabled for short range RF communications, would generally include a suitably configured RF transmitter 44 and RF receiver 46.

Wireless mobile network 50 is, in an example embodiment, a wireless packet data network, (e.g. Mobitex™ or DataTAC™), which provides radio coverage to mobile electronic devices 10, typically employing a terrestrial base stations having associated coverage areas in a cellular-type configuration. Among other things, wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

According to embodiments of the invention, among the software modules resident on personal electronic device 10 is flight mode module 56. Flight mode module 56 includes instructions for execution by microprocessor 38 to place the device 10 into a "flight mode" so that the device 10 can be safely used during the periods of an aircraft flight when non-transmitting personal electronic devices are typically allowed to be on. In various embodiments, the flight mode module 56 may, among other things, be a stand-alone software application 60, part of the operating system 54, or part of another software application 52. In some embodiments, the functions performed by flight mode module 56 may be broken up among different software modules, rather than integrated into a single module. Furthermore, in some embodiments, at least some of the functions performed by the flight mode module may be implemented in firmware of the device 10.

Figure 3:
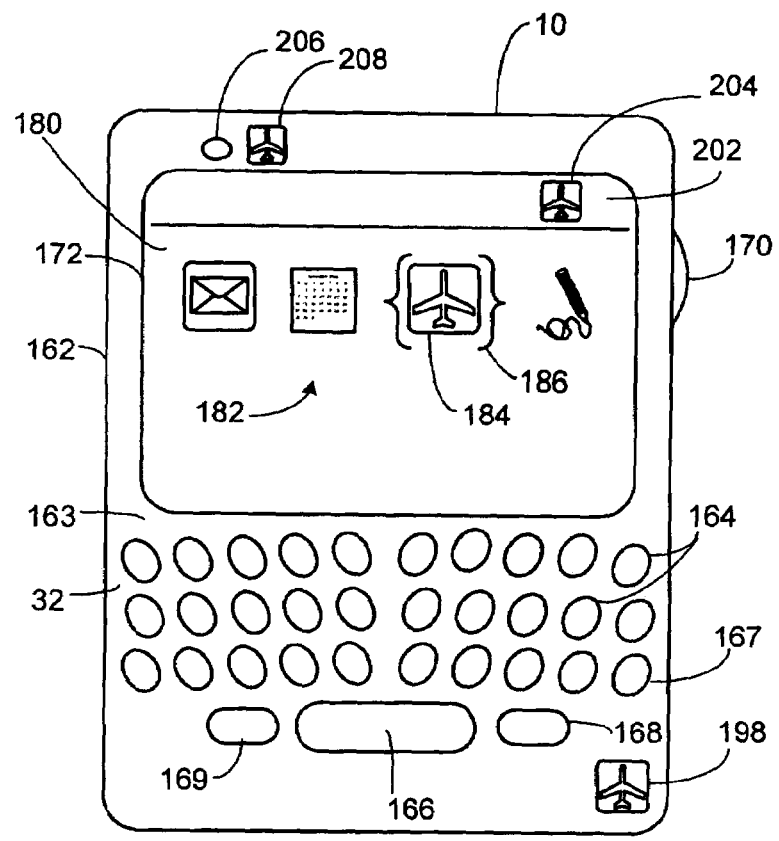
FIG. 3 is front view of a personal electronic device to which example embodiments of the invention may be applied.

FIG. 3 shows, by way of example only, a front view of an embodiment of the personal electronic device 10 of FIG. 2, although it will be understood that the physical configuration of the device 10 could vary widely from that shown in FIG. 3. In the embodiment of device 10 of shown in FIG. 3, the components and subsystems of device 10 are housed within a rigid case 162 that is configured to be hand held while the device 10 is in use. Although the case 162 is shown as a single unit in FIG. 3, it could, among other possible configurations, include two or more case members hinged together (such as a flip-phone configuration or a clam shell-style lap top computer, for example), and could be larger or smaller than a handheld unit. In an example embodiment, the keyboard 32 includes character input buttons or keys for user input of displayable characters, such as substantially similarly sized alphanumeric buttons or keys 164 and a larger elongated space bar button or key 166. The keyboard 32 also includes non-alphanumeric command or control buttons or keys such as line feed or enter key 167, CAP key 168 and CTRL key 169. In the example embodiment of FIG. 3, the keys on the face of device 10 are positioned to be actuated by the thumbs of the user, however in various embodiments the device 10 may also have an integral or connectable keyboard of a smaller or larger size. In some example embodiments, alphanumeric keys 164 and space bar key 166 are arranged in a QWERTY-style or Dvorak-style keyboard having the plurality of alphanumeric keys 164 arranged in a plurality of rows across the face 163 of case 162, with the elongate space bar key 166 centrally located below the last row of alphanumeric keys 164. Alternative keyboard layouts and configurations are used in other embodiments of device 10, and in some embodiments the key board may be replaced by or supplemented with other input mechanisms such as a stylus/touch screen combination, a touch pad, and/or voice activated input, for example. In the embodiment of FIG. 2, the device 10 includes auxiliary I/O system 28, which includes a rotateable and push-able thumbwheel 170. The display system 22 includes an LCD display 72 housed in casing 162.

Figure 6:
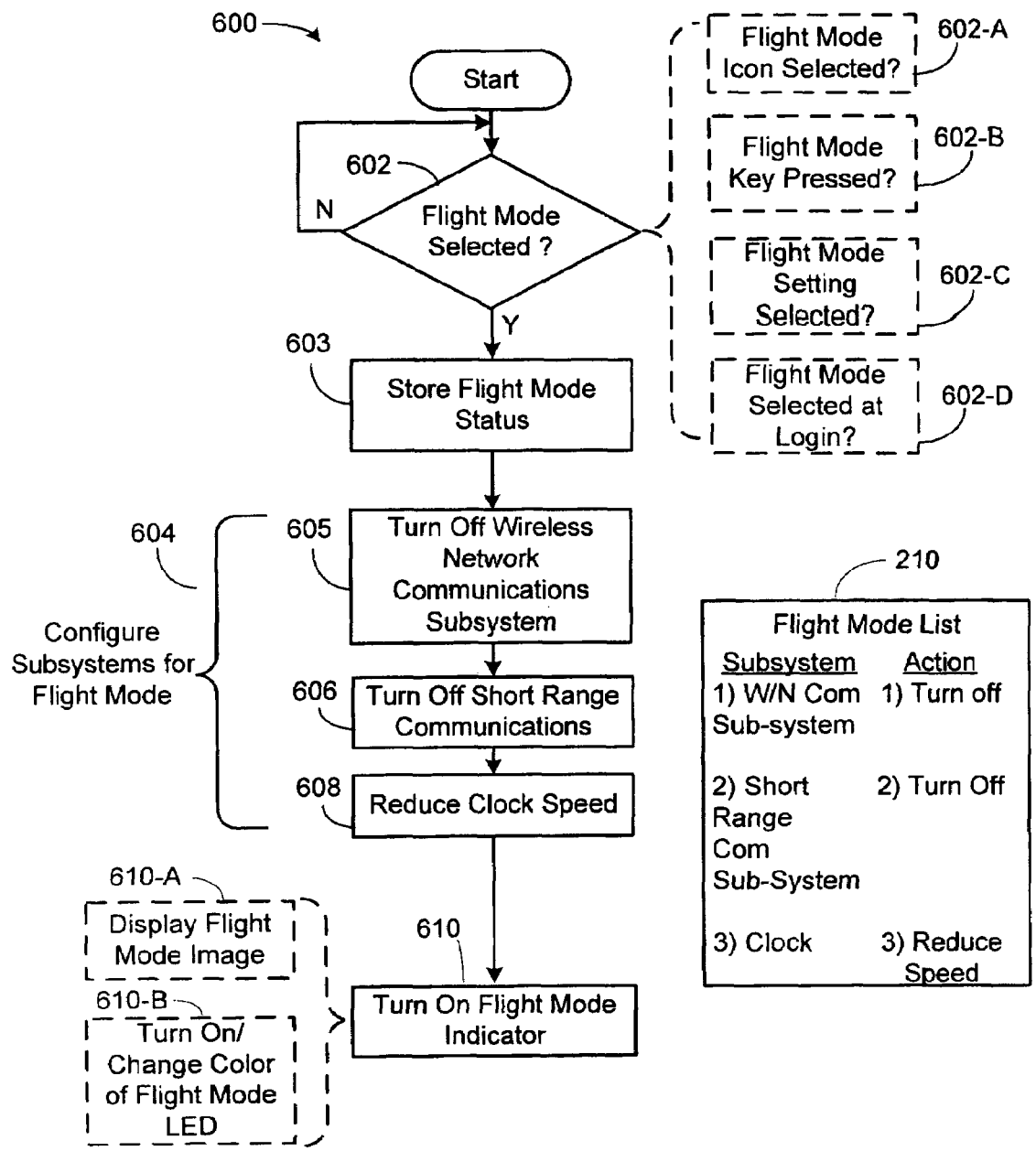
FIG. 6 is a flow diagram of a method executed on a personal electronic device according to example embodiments of the invention for entering a flight mode.

The operation of the personal electronic device 10 will now be discussed according to at least one example embodiment of the invention in which the flight mode module 56 assists a user in configuring the device 10 for operation in a "flight mode" and provides feedback to indicate that the device is or is not in the flight mode. FIG. 6 shows a flow chart of a process 600 carried out by the device 10 under the instruction of flight mode module 56. With reference to the flow chart of FIG. 6, in example embodiments, the flight mode module 56 configures the microprocessor 38 to monitor for and detect the occurrence of one or more predetermined flight mode selection events that indicate that the device 10 is to be put into a flight mode (step 602). As will be explained below, in various embodiments different flight mode selection events may be used to place the device 10 into flight mode. The following paragraphs set out example flight mode selection events according to some example embodiments of the invention.

With reference to FIGS. 3 and 6, in one example embodiment, flight mode initiation is triggered by user selection of an easily recognizable icon (step 602-A). In such an embodiment, the device 10 includes an icon menu user input mode in which a visual user interface 180 on screen 172 displays a plurality of pictorial icons 182. Icons 182 are each selectable to link to or launch an associated application or open an associated folder. Such icons may for example be used to select an E-mail manager application, a calendar application, a note pad application, and the like. Among the selectable icons is a clearly recognizable "flight mode" icon 184 which can be highlighted or focussed by a user through movement of an on-screen position indicator 186, commonly referred to as a caret or cursor. In the embodiment of FIG. 3, the on-screen position indicator 186 is moved through the icon menu items 184 by rotating the scroll wheel 170. When an icon menu item is highlighted or focussed by the on-screen indicator 186, clicking on or depressing the scroll key 170 results in selection of the focussed item.

According to example embodiments, selection of the easily recognizable flight mode icon 184 is recognized by the microprocessor 38 as a predetermined flight mode initiation event, thereby starting the flight mode process 400. In an example embodiment, the flight mode icon includes a pictorial that will generally be universally understood by device users as indicating a flight mode, regardless of the languages understood by the users. For example, the flight mode icon 184 in the illustrated example includes the silhouette of an aircraft. It will be appreciated that various user input mechanisms for selecting icons can be used in various embodiments, including for example touch screen and touch pad and voice activated input mechanisms, among others.

In some example embodiments, flight mode is initiated by activation of a specialized key on keyboard 32 (step 602-B). For example, as shown in FIG. 3, the keyboard 32 can include a specialized flight mode key 198 which when pressed signals to microprocessor 38 that flight mode has been selected. In the illustrated example, the flight mode key 198 includes a pictorial representation of an aircraft to aid in easily and universal recognition of the key. In some embodiments, a combination of keys may need to be activated simultaneously and/or sequentially to initiate flight mode on the device 10. For example, the shift or alt or other key may need to be pressed in combination with flight mode key 198 in order to put the device 10 into flight mode.

Figure 4:
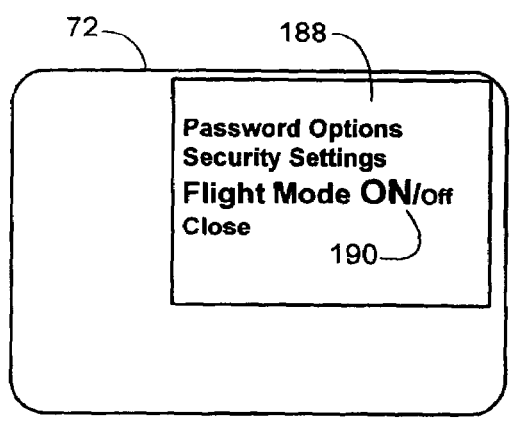
FIG. 4 shows a user interface screen having a selection menu according to example embodiments of the invention.

With reference to FIG. 4, in another example embodiment, the device 10 is programmed to present a configuration or settings menu 188, which may be a drop down menu that is reached through a "settings/control panel" button or icon in user interface 180. The settings menu includes a list of configurable device settings, among which is included a flight mode option 116. When a user scrolls through the items of menu 118 and selects the flight mode option 116, it signals to the microprocessor 38 that flight mode initiation has occurred (step 602-C).

Figure 5:
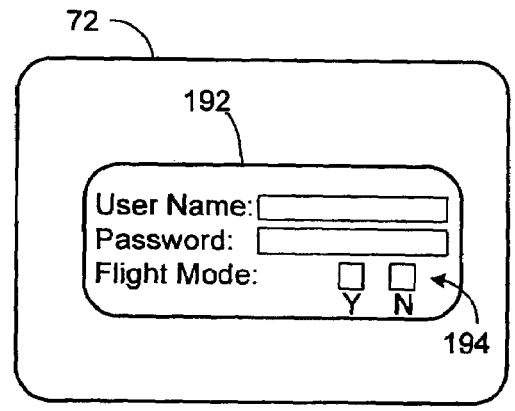
FIG. 5 shows a further user interface screen having a user login display according to example embodiments of the invention.

In another example embodiment, the device 10 includes a start-up or login option that can be selected by the user to configure the device into flight mode. For example, with reference to FIG. 5, the login window 192 includes a flight mode option line 194 so that the user is prompted to select or deselect flight mode when starting up or logging on to the device 10. If flight mode is selected (by selecting the "Y" (Yes) box in FIG. 5) then it signals to the microprocessor 38 that flight mode initiation has occurred (step 602-D).

In some example embodiments, the device 10 is configured such that more than one type of event can be used to put the device in flight mode. For example, in an example embodiment, the device 10 is configured such that the user is able to select flight mode icon 184, or press a designated key 176, or select the flight mode option 190 from menu 188, or check the flight mode option 194 on login window 192, and any of these actions put the device 10 into flight mode.

In example embodiments, once the device 10 has been placed into flight mode, it stays in flight mode until the user takes explicit action to de-select or turn off the flight mode. Thus, as indicated in step 603, the flight mode status is stored in persistent memory of the device 10 such that on device power up a previous selection event placing the device 10 in flight mode is remembered when step 202 is performed. Such a feature permits a user to put the device 10 into flight mode prior to or just after boarding aircraft, then power down for aircraft take-off, and have the device 10 remain in flight mode when the powering back up after take-off.

Once flight mode has been selected, as indicated in step 604, all device subsystems (including all device peripherals) are configured as required are performed so that the device 10 complies with the in-flight operating requirements for personal electronic devices. In an example embodiment, during installation of the flight mode module on the device 10, a set-up process is executed during which all device subsystems that need to be re-configured or altered for the flight mode are stored in persistent memory a flight mode list 210, along with the required configuration action. The flight mode list 210 is consulted during flight mode configuration step 604 and such that all subsystems in the list 210 are configured or modified accordingly so that the device 10 can operate in a flight mode in which it conforms to all predetermined requirements for personal electronic devices on aircraft during normal flight. As indicated in step 605, if the device 10 is equipped with a communications subsystem 11 for a long range wireless network 50, the communications subsystem is shut off so as to disable RF transmitter 12. As indicated in step 606, if the device 10 is equipped with a short range RF communications system 40 such as a wireless LAN, then such system is shut off so as to disable short range RF transmitter 46. As indicated in step 608, if the device 10 is equipped with a clock running at a clock speed exceeding that permitted for a personal electronic device on a commercial aircraft, then the clock speed is reduced to fall below a range that may cause RF interference. Other device subsystems may also be adjusted.

As indicated in step 610, in at least some example embodiments, the flight mode module 56 configures the microprocessor 38 to turn on a prominent and easy to understand flight mode indicator once the device 10 has been placed into flight mode. With reference to step 610-A and FIG. 3, in one example embodiment, the display screen 172 of the device displays an electronic image 204 of an aircraft, which could be flashing, in a status bar 202 area of the display, thereby providing a visible feedback that the device is in a flight mode. The use of an aircraft image provides an indicator that can be universally understood regardless of language. With reference to step 610-B and FIG. 3, in another example embodiment, in place of or in addition to displayed image 204, a light such as an LED 206 is provided on the device casing 162 for indicating when the device is in flight mode. The LED could, for example, be blue in flight mode to indicate that the device is safe to be used, and could be located next to, or under, a printed and/or embossed image 208 of an aircraft on the casing 162. The light could be off when not in flight mode, or could be a different color, for example "red", and then turn on or change color when flight mode is entered. The use of an obvious flight mode indicator is beneficial not only for providing feedback to the user, but also for providing feedback to aircraft crew who may want to check the personal electronic devices of passengers to ensure that they are in flight mode.

Thus, the flight mode module 56 and method 600 provide a system in which the user of the device can cause the device to enter flight mode by selecting from easily understood visual images and/or text that is/are presented in a fashion easily understood by the user. Once the user selects flight mode, all steps necessary to make the device conform to normal in-flight requirements are automatically executed, and an easily identifiable flight mode indicator is presented to the user (or flight crew).

Figure 7:
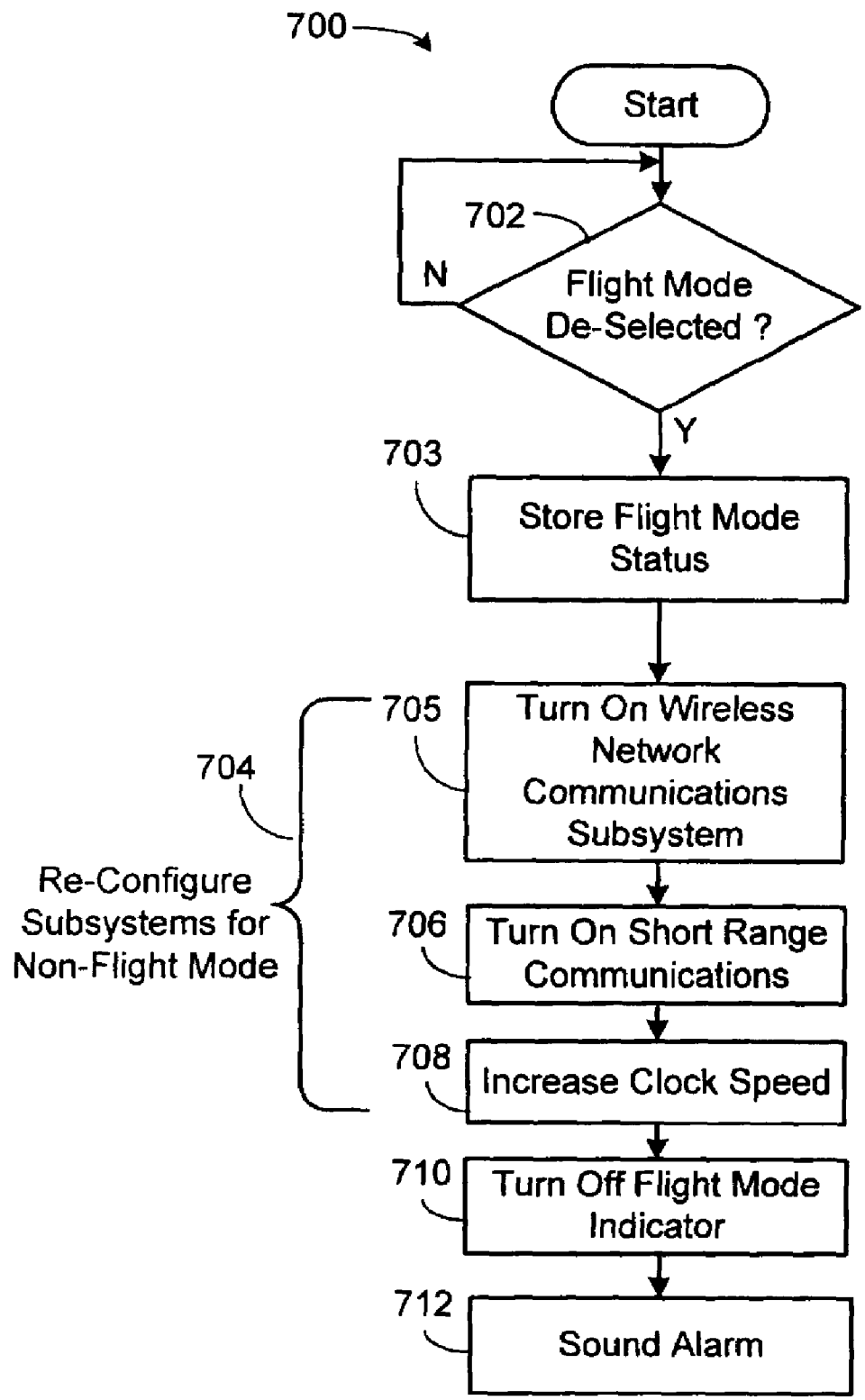
FIG. 7 is a flow diagram of a method for exiting a flight mode.

As noted above, in example embodiments, once in flight mode the device 10 will stay that way until the user takes positive steps to return to a normal operating mode. In this regard, FIG. 7 shows a method 700 for exiting flight mode and returning to a normal non-flight mode. In method 700, the microprocessor 38 monitors for de-selection of flight mode (step 702). A user can de-select flight mode in a manner similar to which it was selected in the first place, for example by selecting an icon from interface 182, a menu item from settings menu 188, or the no (N) flight mode setting in login window 192, or repressing flight mode key 198. Once flight mode is de-selected, the new flight mode status (off) is stored (step 703), the operating characteristics of the device 10 are restored to their previous non-flight mode conditions (step 704), including for example reactivating the wireless network communications subsystem 11 (step 705), reactivating the short range communication subsystem 40 (step 706) and increasing the clock speed (step 708). The flight mode indicator is also turned off (step 710). In one example embodiment, an audible alarm is sounded (step 712) either before, after and/or during reconfiguration step 704 to indicate that flight mode has been exited. Such alarm can be used to help notify the device user and/or the aircraft flight crew of the de-selected flight mode status.

Referring again to FIG. 1, in yet another example embodiment of the invention, the personal electronic devices 10 are configured to enter flight mode when device 10 receives a predetermined radio signal. In such embodiments, the aircraft 5 includes a special aircraft control unit (CU) transmitter 200 under the control of the aircraft flight crew for transmitting a flight mode initiation RF signal to the personal electronic devices 10 that are located with the cabin and cargo areas of the aircraft 5. Upon receipt of the predetermined signal, each receiving device 10 is configured into its flight mode. In various embodiments, the flight mode initiation RF signal may be a signal that is intended for receipt by communications subsystem 11 of devices 10, and in some embodiments, it may be a signal intended for receipt by short range communications subsystem 40 of devices 10. In some embodiments, the aircraft control unit 200 may transmit a variety of different RF signals in order to be compatible with different types of devices 10. In some embodiments, infra-red signals may be used in place of or in addition to RF signals.

In some embodiments, the aircraft control unit 200 transmits a first predetermined signal to indicate that the aircraft 5 is in normal flight ("normal flight" signal) and that flight mode operation of devices 10 is permitted, and a second predetermined signal ("takeoff/landing" signal) to indicate that the aircraft 5 is taking off or landing or in a state of emergency (the time period when all personal electronic devices 10 should be turned off). The "normal flight" signal may be transmitted continuously during normal flight durations when flight mode operation is permitted, or may be transmitted periodically at set intervals, or may just be transmitted at the start of normal flight durations, in various embodiments. Similarly, the "takeoff/landing" signal could be transmitted continuously during takeoff/landing/emergency durations, or may be transmitted periodically during such durations, or may just be transmitted at the start of takeoff/landing/emergency durations in various embodiments.

In one embodiment, when the "takeoff/landing" signal is transmitted, the device 10 is configured to automatically shut off. When the "normal flight" signal is transmitted, the device 10 is placed into flight mode. In some embodiments once a "takeoff/landing" signal is received from aircraft 200, the device is placed into flight mode and shut off. The device will immediately power down again if powered up when the "takeoff/landing" signal is still being received, but will power up in flight mode if the takeoff/landing signal is no longer being received. The "normal flight" signal can be transmitted during flight to put any personal electronic devices 10 that were off during the initial "takeoff/landing"

signal into flight mode. Once the aircraft has landed, the user can manually return to normal mode as using the de-selection methods discussed above.

Figure 8:
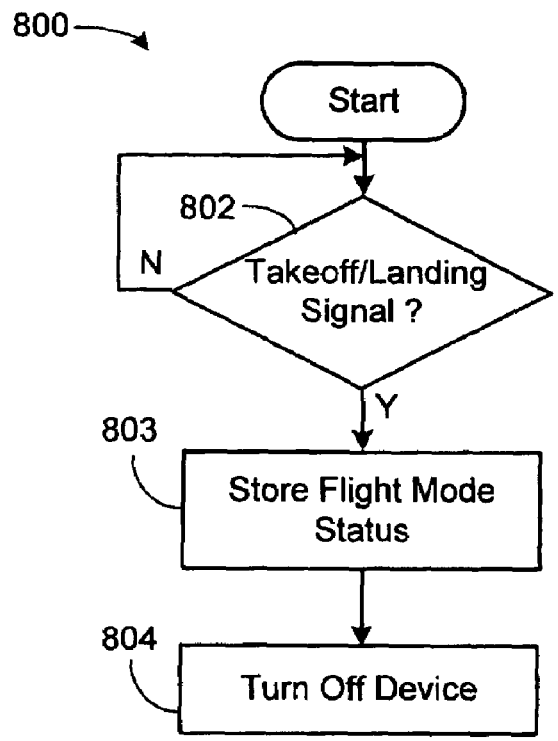
FIG. 8 is a flow diagram of a further method for entering a flight mode according to example embodiments.

Thus, in one example embodiment in which an aircraft control unit is used to transmit a "takeoff/landing" signal and a "normal flight" signal, the method used by device 10 for handing the "normal fight" signal would be similar to that shown in method 600 of FIG. 6, with the "normal flight" signal functioning as a flight mode selection event. The "takeoff/landing" signal would also function as a flight mode selection event, however would have the added feature of triggering a device shutdown. Thus, as shown in steps 802, 803 and 804 of method 800 of FIG. 8, upon detection of a "takeoff/landing" signal, the device 10 would store the flight mode status in persistent memory and then power down. When the device 10 was subsequently powered up, the positive flight mode selection is recalled in step 602 of method 600, and the device subsystems configured according to the flight mode list 210. In some embodiments, the device subsystems could be re-configured prior to device shut down alternatively or as well.

The aircraft control unit 200 could have a configuration similar to that shown in FIG. 2, among other possible configurations, could be a handheld or other portable unit, or could be a stationary unit integrated into the aircraft 5.

Figure 9:
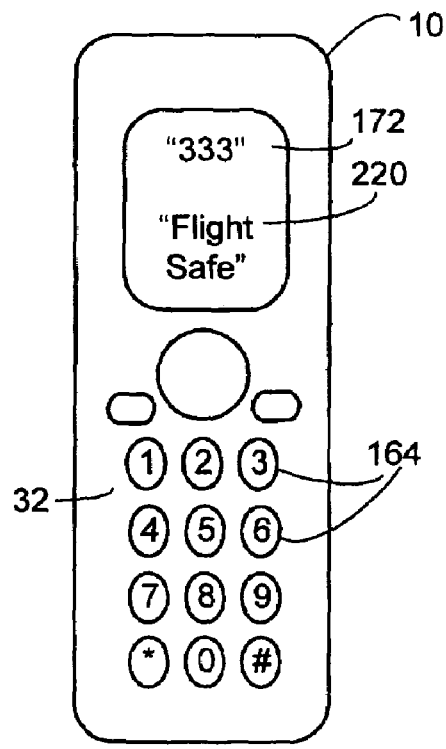
FIG. 9 shows a front view showing a further configuration of a personal electronic device to when example embodiments of the invention may be applied.

In some embodiments, other indicators could be used to indicate that a device 10 is in a flight mode. By way of example, FIG. 9 shows personal electronic device 10 having a configuration similar to that of cell-phone type device that has some processor based functionality. In such a telephone enabled device in an example embodiment dialling a predetermined number, for example "333" on numerical keypad 32 would return a textual "flight safe" message 220 on the device screen 172 when the device was in flight mode. In some example embodiments, entry of a predetermined word or phrase by a person such as a flight crew member would return a textual "flight safe" message 220 on the device screen 172 when the device was in flight mode.

In one configuration, the device 10 includes an auxiliary input device 28 that measures air pressure and inputs a signal representative of air pressure to microprocessor 38. In such configuration, the flight mode module 56 is configured to monitor the measured air pressure to detect if a change in air pressure occurs that is indicative of aircraft takeoff, and if so sound an alarm if the device is not in flight safe mode. Sudden changes in air pressure, for example drop in air pressure in excess of a predetermined threshold within a predetermined time interval is interpreted by flight mode module 56 as indicative of aircraft takeoff in one example embodiment. In another example, a simple drop in air pressure below a predetermined threshold is interpreted by flight mode module 56 as indicative of aircraft takeoff in one example embodiment. In one configuration, the device is automatically put into flight safe by the flight mode module 56 upon detecting a change in air pressure occurs that is indicative of aircraft takeoff, and a visual and/or audible indication provided that the device 10 has switched into flight safe mode.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A personal communications device, comprising:
a processor;
a plurality of subsystems connected to the processor for exchanging signals therewith, at least one of the subsystems being configurable between a flight mode and a non-flight mode;
an input device connected to the processor for inputting a flight mode selection thereto;
a flight mode module operable on the processor for causing the processor to monitor for input of a predetermined flight mode selection through the input device and configure the at least one subsystem into flight mode upon the input of the flight mode selection; and
a visual display device including a display screen responsive to the processor for displaying a visual indication including a graphical image when the at least one subsystem is in flight mode, wherein the graphical image includes an image of an aircraft.

2. The device of claim 1 wherein a graphical interface displayed on the display screen includes a status bar area in which the flight mode indication is displayed when the at least one subsystem is in flight mode, the graphical interface also including a plurality of user selectable pictorial icons including a flight mode icon, wherein selection of the flight mode icon by the user through the input device inputs the flight mode selection to the processor.

3. A personal communications device, comprising:
a processor;
a plurality of subsystems connected to the processor for exchanging signals therewith, at least one of the subsystems being configuretable between a flight mode and a non-flight mode;
an input device connected to the processor for inputting a flight mode selection thereto; and
a flight mode module operable on the processor for causing the processor to monitor for input of a predetermined flight mode selection through the input device and configures the at least one subsystem into flight mode upon the input of the flight mode selection, wherein the at least one subsystem includes a clock connected to the processor and having a higher speed and a lower speed, wherein in fight mode the clock is configured to run at the lower speed.

4. A personal communications device, comprising:
a processor;
a plurality of subsystems connected to the processor for exchanging signals therewith, at least one of the subsystems being configurable between a flight mode and a non-flight mode;
an input device connected to the processor for inputting a flight mode selection thereto;
a flight mode module operable on the processor for causing the processor to monitor for input of a predetermined flight mode selection through the input device and configure the at least one subsystem into flight mode upon the input of the flight mode selection; and
a keyboard and display screen connected to the processor, the flight mode module being configured to detect when a predetermined keyboard sequence associated with a flight mode status inquiry is entered, and upon detecting the predetermined keyboard sequence when the device is in flight mode display a confirmation message on the display screen that the device is in flight mode.

5. A personal communications device, comprising:
a processor;
a plurality of subsystems connected to the processor for exchanging signals therewith, at least one of the subsystems being configurable between a flight mode and a non-flight mode;

an input device connected to the processor for inputting a flight mode selection thereto; and a flight mode module operable on the processor for causing the processor to monitor for input of a predetermined flight mode selection through the input device and configure the at least one subsystem into flight mode upon the input of the flight mode selection, wherein the input device includes a wireless communications subsystem for receiving wireless communications signals, wherein in flight mode the device is automatically shut down upon receiving the predetermined flight mode selection through the wireless communications subsystem.

6. A personal communications device, comprising:

a processor;

a plurality of subsystems connected to the processor for exchanging signals etherewith, at least one of the subsystems being configurable between a flight mode and a non-flight mode;

an input device connected to the processor for inputting a flight mode selection thereto; and a flight mode module operable on the processor for causing the processor to monitor for input of a predetermined flight mode selection through the input device and configure the at least one subsystem into flight mode upon the input of the flight mode selection, wherein the input device includes a wireless communications subsystem for receiving wireless communications signals, wherein the flight mode module is operable on the processor for causing the processor to monitor for the predetermined flight mode selection input and a further predetermined flight mode selection input through the wireless communications subsystem, wherein upon receipt of the further predetermined flight mode selection the processor causes the device to shut down.

7. A personal communications device, comprising:

a processor;

a plurality of subsystems connected to the processor for exchanging signals therewith, at least one of the subsystems being configurable between a flight mode and a non-flight mode;

an input device connected to the processor for inputting a flight mode selection thereto; and a flight mode module operable on the processor for causing the processor to monitor for input of a predetermined flight mode selection through the input device and configure the at least one subsystem into flight mode upon the input of the flight mode selection, wherein the input device includes an air pressure sensing input device for monitoring air pressure, the predetermined flight mode selection including a sensed air pressure characteristic indicative of aircraft takeoff.

8. The personal communications device of claim 7 wherein the processor is configured to turn the device off upon detecting the predetermined flight mode selection.

9. A personal communications device, comprising:

a processor;

a plurality of subsystems connected to the processor for exchanging signals therewith, at least one of the subsystems being configurable between a flight mode and a non-flight mode;

an input device connected to the processor for inputting a flight mode selection thereto;

a flight mode module operable on the processor for causing the processor to monitor for input of a predetermined flight mode selection through the input device and configure the at least one subsystem into flight mode upon the input of the flight mode selection; and a speaker connected to the processor, the processor being configured to monitor for an input selecting an exit from flight mode and sound an audible alarm over the speaker subsequent to detecting the flight mode exit selection input.

* * * * *